United States Patent [19]

Fried

[11] 4,435,045

[45] Mar. 6, 1984

[54] BUILT-UP MIRROR WITH REDUCED TEMPERATURE GRADIENT

[75] Inventor: Lawrence Fried, Palo Alto, Calif.

[73] Assignee: The United States of America as represented by the Secretary of the Navy, Washington, D.C.

[21] Appl. No.: 372,877

[22] Filed: Apr. 29, 1982

[51] Int. Cl.³ .......................... G02B 5/08; G02B 522; G02B 5/24; B32B 3/00
[52] U.S. Cl. ..................................... 350/310; 428/73; 428/118; 428/119; 350/1.6; 350/1.7
[58] Field of Search ............... 350/310, 320, 1.6, 1.7; 428/73, 118, 119

[56] References Cited

U.S. PATENT DOCUMENTS

| | | | |
|---|---|---|---|
| 3,600,257 | 8/1971 | Reinhardt | 161/4 |
| 3,694,059 | 9/1972 | Shakespeare | 350/310 |
| 3,703,813 | 11/1972 | Olevitch et al. | 62/3 |
| 4,110,013 | 8/1978 | Eitel | 350/310 |

Primary Examiner—John K. Corbin
Assistant Examiner—Richard F. Gallivan
Attorney, Agent, or Firm—Robert F. Beers; Harvey A. David

[57] ABSTRACT

A built-up glass mirror structure of the type having front and rear plates held in spaced relation by spacer walls arranged in a cellular pattern has temperature gradients reduced by inclusion of highly reflective coating, such as silvering, of the spacer wall surfaces in each cell in combination with the inwardly facing surfaces at opposite ends of the cells being relatively highly emissive and absorptive of radiant thermal energy.

9 Claims, 3 Drawing Figures

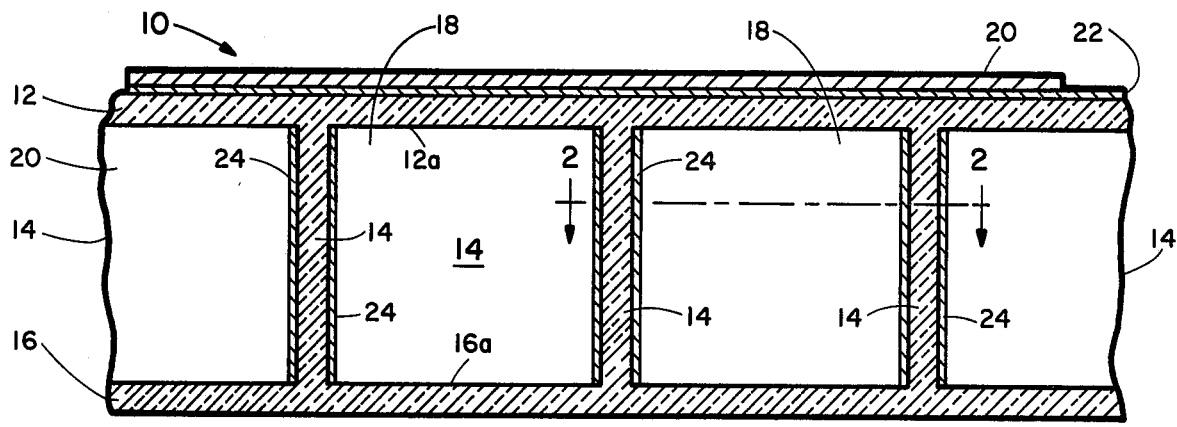
FIG. 1
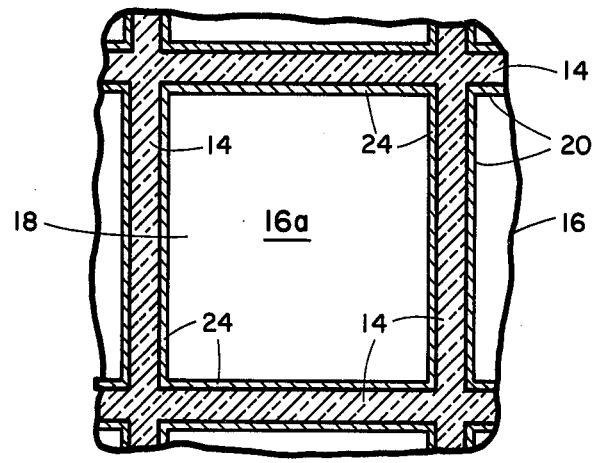
FIG. 2
| M I R R O R | FRONT OPAQUE SURFACE | CELL SIDE WALLS | HEATER ON BACK | MAX. CELL FRONT-TO-BACK ΔT IN °C (1) | | MAX. CELL FRONT CENTER-TO-EDGE ΔT IN °C | |
|---|---|---|---|---|---|---|---|
| | | | | SUN | SHADE | SUN | SHADE |
| a | ALUM. | ULE | NO | +36.0 | −19.0 | +3.0 | −2.0 |
| b | SILVER | ULE | YES | +(*) | −13.0 | +1.3 | −1.0 |
| c | SILVER | SILVERED | YES | +(*) | −2.0 | +1.2 | −0.6 |
| d | SILVER | SILVERED | NO | +4.1 | −2.0 | +0.9 | −0.5 |
| *POSITIVE ΔT IS ADJUSTABLE TO ANY DESIRED VALUE BY HEATER CONTROL; (1) FRONT AND BACK WALLS HAVE ULE FACING CELL INTERIOR | | | | | | | |
FIG. 3

BUILT-UP MIRROR WITH REDUCED TEMPERATURE GRADIENT

BACKGROUND OF THE INVENTION

This invention relates generally to the field of built-up mirrors and more particularly to improvements in light weight mirrors suitable for use in space telescopes or other light or laser beam collecting or reflecting devices.

Orbital space vehicles, and in particular mirror devices carried thereby, are subjected to wide excursions in degree of exposure to sunlight which, if not compensated for in some manner, would result in such temperature induced distortions that the effectiveness of the device would become seriously degraded. In order to keep the weight of mirrors down it has been the practice to provide a reflective face plate that is backed by a cellular stiffening structure, wherein the cells may have any desired shape such as square or a honeycomb configuration, and usually with a back or rear plate. While various other materials have been used or proposed for such mirrors, glass of the type known as ULE (ultra low expansion) remains in use and it is principally to such mirrors that this invention has application. Typically, the glass front, back, and cell wall elements are bonded together by fusion of glass frit to make a unitary structure of high rigidity, but characterized by the relatively low thermal conductivity of ULE.

The expedients considered or used heretofore for avoiding or reducing temperature induced mirror distortion include heating means for adding heat to the back plate to reduce front to rear temperature differentials during periods when the front plate is being heated by exposure to the sun, the use of opaque front reflective coatings to reduce greenhouse effect in the cell structure, and the inclusion of circulated tempering fluids or the like. Of course, those expedients, especially the use of heaters, fluid circulation and the like are complex, expensive, and add materially to the weight of the system, all of which are important considerations in a system to be used in an orbital space vehicle.

SUMMARY OF THE INVENTION

With the foregoing in mind, it is a principal object of this invention to provide an improved frit bonded glass mirror type having front and rear plates separated by walls defining cells, and which mirror is characterized by improved transfer of thermal energy between the front and rear thereof.

Another object of the invention is to provide a lightweight, cellular, glass mirror construction wherein temperature equalization is achieved or approached without the need for additional thermal energy being added to the rear or front plates or surfaces.

Still another object is the provision of a mirror of the foregoing character wherein the improvements and benefits are achieved through treatment or coating of the various interior surfaces of the cells or cavities defined between the front and rear plates and the associated cell or spacer side walls.

As yet another object, the invention aims to achieve the foregoing through the use of highly reflective coatings on the cell side walls either alone or in conjunction with highly radiating and absorbing coatings or treatment of the end walls defined by the inner surfaces of the front and rear plates.

Other objects and many of the attendant advantages will be readily appreciated as the subject invention becomes better understood by reference to the following detailed description, when considered in conjunction with the accompanying drawings.

DESCRIPTION OF THE DRAWINGS

FIG. 1 is a fragmentary vertical sectional view of an exemplary mirror structure embodying the present invention;

FIG. 2 is a fragmentary horizontal sectional view taken substantially along line 2—2 of FIG. 1; and FIG. 3 is a comparative tabular illustration of computer modeled front-to-back and cell center-to-edge temperature relations of mirrors with and without the benefit of the invention.

DESCRIPTION OF THE PREFERRED EMBODIMENT

Referring to FIG. 1, a representative segment of an exemplary mirror 10 embodying the invention comprises a front plate 12 which may be either flat or curved in accordance with the intended application of the mirror, but is flat in this example. The front plate 12 is formed of glass of the type known to those skilled in the art to which the invention pertains as ULE (ultra low expansion) and is either cast integrally with, or bonded by fusion of glass frit to, ULE glass spacer walls 14. The mirror 10 further comprises a ULE glass rear wall 16 held at a predetermined distace from the front wall 12 by the spacer walls 14 and conveniently frit bonded thereto. The spacer walls 14 are conveniently formed in a pattern separating the space between the front and rear walls into square cells 18, as is best shown in FIG. 2, of which the inner surfaces of the front and rear plates define the ends and the surfaces of the spacer walls define the sides.

The forward facing or reflecting side of the front plate 12 is provided in this example with a laser-reflective dielectric coating or layer 20. An opaque coating 22 is provided under the laser-reflective layer 20 in order to prevent solar energy from entering the mirror and ultimately resulting in a greenhouse effect. The opaque coating 22 may be of a metal and in the present embodiment is silver and sufficiently specularly reflecting so as to absorb as little of the impinging radiant energy as possible. The ULE rear wall 16 is in the embodiment being described, considered as being adiabatic in that it is opaque in the infra-red.

According to this invention, the surfaces of the glass spacer walls 14, that is the side walls of the cells 18, are each treated or coated with a highly reflective layer 24, whereas the inwardly facing surfaces 12a and 16a, respectively, of the front and rear plates are left as nonspecular, untreated ULE and are relatively highly absorptive (emissive). The reflective layers 24 on the side walls 14 can be achieved by any of the well known, preferably specularly reflecting, materials such as aluminum, silver, gold, or the like.

The table of FIG. 3 represents the results of computer modeling of four mirrors a, b, c, and d, the first two (a,b) of which did not employ reflective coating 24 on the cell side walls 14, while the latter two (c,d) have the side walls reflectively coated in accordance with the invention. The modeling considered a synchronous altitude and an orbital plane parallel to the suns rays ($\beta=0$). In this orbit the normal to the mirror varies from pointing directly at the sun to pointing 180° away and the satellite spends maximum time in the earth's shadow. The mirrors were considered to comprise 1 mm thick ULE top and bottom walls 12 and 16, spaced 133 mm, and joined by 54 mm square cells 18 formed by 2 mm thick spacer walls 14 of ULE. Emissivity of ULE was measured at 0.82 for this application.

The first condition analyzed was for a mirror (a) whose front face was coated with aluminum before application of the dielectric coating. Analysis showed that in this particular orbit, the maximum front-to-back temperature differences were: +36° C. (64° F.) caused by heating by the sun, and −19° C. (−35° F.) in the sun's absence. Maximum temperature differences from the center to the edges of the cell on this front sheet were +3° C. and −2° C. The local deformations resulting when the mirror was corrected for the 36° C. difference were considered to be excessive and thus improvements were needed to allow use of the frit-bonded design.

The second condition analyzed was for a mirror (b) having its back face heated so that the front face average temperature is never more than 0.1 C (this is arbitrary) above the rear face; front face silvered, instead of aluminized: front-to-back temperature differences were +0.1° C., −13° C. maximum. The maximum temperature differences from center to cell edge were +1.3° C., −1.0° C.

Mirror (c) conditions were similar to (b), plus internal silvering or aluminizing of the vertical cell walls: a significant drop in front-to-back temperature differences is noted as +0.1° C., −2° C. Cell-edge differences are approximately 70% of those in (a).

Mirror (d) with internal silvering only, that is without any heater, showed front-to-back temperature differences of +4.1° C., −2° C.; Cell center-edge: +0.9° C., −0.5° C.

From the foregoing, it can be seen that the combination of emissive/absorptive inner cell end surfaces, together with reflective coating or treatment of the cell side wall surfaces, produces a notable reduction in temperature differences (gradients) between the front and back of a built-up ULE mirror. As an alternative, the invention contemplates enhancement of the emissivity of the cell end surfaces, for example by suitable coatings of finely divided metal or other black body types of treatment.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A frit bonded, built-up glass mirror for use in orbital space, said miror comprising:
   a glass front wall;
   a glass rear wall disposed in predetermined spaced relation to said front wall;
   a plurality of glass spacer walls interconnecting said front and rear walls and arranged in a pattern defining a plurality of cells the cell ends of which are defined by the inner surfaces of said front and rear walls and the cell sides of which are defined by the surfaces of said spacer walls;
   a reflective coating on the outer surface of said front wall;
   said inner surfaces of said front and rear walls being characterized as relatively highly emissive and absorptive of radiant energy; and
   said surfaces of said spacer walls being coated with a reflective layer of highly specular material, whereby radiant energy emitted from one of said end walls of a cell is reflected to and absorbed by the other of said end walls of said cell.

2. A mirror as defined in claim 1, and wherein:
   said front, rear, and spacer walls are formed of low expansion glass; and
   said reflective layer of highly specular material comprises a metallic layer.

3. A mirror as defined in claim 2 and wherein:
   said metallic layer is silver.

4. A mirror as defined in claim 3, and wherein:
   said inner surfaces of said front and rear walls have been treated to enhance the emissivity and absorptivity thereof.

5. A mirror as defined in claim 4, and wherein:
   said reflective coating on said outer surface of said front wall comprises a layer of a laser-reflective dielectric material over an opaque metallic layer.

6. In a mirror built-up of frit bonded glass wall components to comprise a plurality of cells having front, back and side walls, the front walls of which carry an outwardly facing reflective surface adapted to be cyclically directed toward and from the sun, the improvement comprising a reflective coating on the surfaces of said side walls, so that energy radiated from the inner surface of said front walls of said cells is reflected by said reflective coating on said side walls and absorbed by the rear walls, whereby maximum temperature differences between said front and rear walls are reduced.

7. The improvement in a mirror as defined in claim 6, and wherein said reflective coating on the surfaces of said side walls comprise metallic specularly reflecting layer.

8. The improvement in a mirror as defined in claim 7, and wherein said reflective coating comprises silver.

9. The improvement in a mirror as defined in claim 7, and wherein the inner surfaces of said front and rear walls are nonspecular so as to be relatively highly emissive and absorptive of radiant energy.

* * * * *